(12) United States Patent
Lee et al.

(10) Patent No.: US 11,532,305 B2
(45) Date of Patent: Dec. 20, 2022

(54) ELECTRONIC APPARATUS AND CONTROL METHOD THEREOF

(71) Applicant: SAMSUNG ELECTRONICS CO., LTD., Suwon-si (KR)

(72) Inventors: Eunji Lee, Suwon-si (KR); Hyeonmok Ko, Suwon-si (KR); Kyenghun Lee, Suwon-si (KR); Saebom Jang, Suwon-si (KR); Pureum Jung, Suwon-si (KR); Sungja Choi, Suwon-si (KR); Changho Paeon, Suwon-si (KR); Jiyeon Hong, Suwon-si (KR); Inchul Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 55 days.

(21) Appl. No.: 16/913,310

(22) Filed: Jun. 26, 2020

(65) Prior Publication Data

US 2020/0411002 A1 Dec. 31, 2020

Related U.S. Application Data

(60) Provisional application No. 62/889,229, filed on Aug. 20, 2019, provisional application No. 62/866,716, filed on Jun. 26, 2019.

(30) Foreign Application Priority Data

Dec. 31, 2019 (KR) .................. 10-2019-0179747
Apr. 6, 2020 (KR) .................. 10-2020-0041470

(51) Int. Cl.
*G10L 15/00* (2013.01)
*G10L 15/22* (2006.01)
(Continued)

(52) U.S. Cl.
CPC ............ *G10L 15/22* (2013.01); *G10L 15/183* (2013.01); *G10L 15/1815* (2013.01);
(Continued)

(58) Field of Classification Search
CPC combination set(s) only.
See application file for complete search history.

(56) References Cited

U.S. PATENT DOCUMENTS 8,065,146 B2 11/2011 Acero et al.
8,798,990 B2 8/2014 Bangalore et al.
(Continued)

FOREIGN PATENT DOCUMENTS

KR 10-2013-114852 A 10/2013
KR 1020180138513 A 12/2018
(Continued)

OTHER PUBLICATIONS

Communication dated Nov. 26, 2020 issued by the European Patent Office in European Application No. 20181461.3.
(Continued)

*Primary Examiner* — Vu B Hang
(74) *Attorney, Agent, or Firm* — Sughrue Mion, PLLC

(57) ABSTRACT

An electronic apparatus is provided. The electronic apparatus includes: a memory configured to store at least one instruction; and a processor configured to execute the at least one instruction to: obtain usage information on an application installed in the electronic apparatus, obtain a natural language understanding model, among a plurality of natural language understanding models, corresponding to the application based on the usage information, perform natural language understanding of a user voice input related to the application based on the natural language understanding
(Continued)

model corresponding to the application, and perform an operation of the application based on the preformed natural language understanding.

17 Claims, 9 Drawing Sheets

(51) Int. Cl.
  *G10L 15/18* (2013.01)
  *G10L 15/183* (2013.01)
  *G10L 15/30* (2013.01)
(52) U.S. Cl.
  CPC .......... *G10L 15/30* (2013.01); *G10L 15/1822* (2013.01); *G10L 2015/223* (2013.01)

(56) References Cited

U.S. PATENT DOCUMENTS

| | | |
|---|---|---|
| 10,133,613 B2 | 11/2018 | Surti et al. |
| 10,282,218 B2 | 5/2019 | Li et al. |
| 2008/0015846 A1 | 1/2008 | Acero et al. |
| 2011/0208524 A1 | 8/2011 | Haughay |
| 2013/0254035 A1 | 9/2013 | Ramer et al. |
| 2013/0311997 A1 | 11/2013 | Gruber et al. |
| 2015/0120287 A1 | 4/2015 | Stern et al. |
| 2015/0170053 A1 | 6/2015 | Miao |
| 2016/0071519 A1 | 3/2016 | Hoffmeister et al. |
| 2016/0259775 A1 | 9/2016 | Gelfenbeyn et al. |
| 2017/0018268 A1 | 1/2017 | Quast |
| 2017/0060848 A1 | 3/2017 | Liu et al. |
| 2018/0174580 A1* | 6/2018 | Kim ................. G10L 15/197 |
| 2018/0374482 A1 | 12/2018 | Woo et al. |

FOREIGN PATENT DOCUMENTS

| | | |
|---|---|---|
| RU | 2439716 C2 | 1/2012 |
| RU | 2691855 C1 | 6/2019 |

OTHER PUBLICATIONS

International Search Report (PCT/ISA/210) and Written Opinion (PCT/ISA/237) dated Sep. 25, 2020 issued by the International Searching Authority in International Application No. PCT/KR2020/008229.

Communication dated Jan. 26, 2022 issued by the European Patent Office in application No. 20181461.3.

Communication dated Jun. 21, 2022 by the Intellectual Property Office of India in counterpart Indian Patent Application No. 202117058786.

Communication dated Oct. 6, 2022 by the Russian Patent Office in Russian Application No. 2022100335.

* cited by examiner

ND CONTROL
ELECTRONIC APPARATUS AND CONTROL METHOD THEREOF

CROSS-REFERENCE TO RELATED APPLICATION(S)

This application is based on and claims priority under 35 U.S.C. § 119 to Korean Patent Application No. 10-2019-0179747, filed on Dec. 31, 2019, and Korean Patent Application No. 10-2020-0041470, filed on Apr. 6, 2020, in the Korean Intellectual Property Office, and is based on and claims the benefit of U.S. Provisional Patent Application No. 62/866,716, filed on Jun. 26, 2019, and U.S. Provisional Patent Application No. 62/889,229, filed on Aug. 20, 2019, in the U.S. Patent and Trademark Office, the disclosures of which are incorporated by reference herein in their entireties.

BACKGROUND

1. Field

The disclosure relates to an electronic apparatus for acquiring a natural language understanding model and a control method thereof.

2. Description of the Related Art

A natural language understanding model is a model that analyzes a user's voice and grasps a user's intention included in the user's voice. Such a natural language understanding model may exist separately for each of different applications.

However, in order to store the natural language understanding model for all applications installed on an electronic apparatus such as a smartphone, a storage capacity of the electronic apparatus may need to be increased.

In addition, when the natural language understanding model is received from a server and used as necessary, time must elapse to receive the natural language understanding model. Further, the natural language understanding model is not received in a situation in which a network is not connected.

SUMMARY

The disclosure provides an electronic apparatus for acquiring a natural language understanding model corresponding to an operation of an application frequently used by a user, and a control method thereof.

Additional aspects will be set forth in part in the description which follows and, in part, will be apparent from the description or may be learned by practice of the presented embodiments.

In accordance with an aspect of the disclosure, an electronic apparatus includes: a memory configured to store at least one instruction; and a processor configured to execute the at least one instruction to: obtain usage information on an application installed in the electronic apparatus, obtain a natural language understanding model, among a plurality of natural language understanding models, corresponding to the application based on the usage information, perform natural language understanding of a user voice input related to the application based on the natural language understanding model corresponding to the application, and perform an operation of the application based on the preformed natural language understanding.

In accordance with another aspect of the disclosure, a control method of an electronic apparatus includes: obtaining usage information on an application installed in the electronic apparatus; obtaining, based on the usage information, a natural language understanding model, among a plurality of natural language understanding models, corresponding to the application; performing natural language understanding of a user voice input related to the application based on the natural language understanding model corresponding to the application; and performing an operation of the application based on the performed natural language understanding.

In accordance with another aspect of the disclosure, a non-transitory computer-readable recording medium has recorded thereon instructions executable by at least one processor to perform a control method of an electronic apparatus, the control method including: obtaining usage information on an application installed in the electronic apparatus; obtaining, based on the usage information, a natural language understanding model, among a plurality of natural language understanding models, corresponding to the application; performing natural language understanding of a user voice input related to the application based on the natural language understanding model corresponding to the application; and performing an operation of the application based on the performed natural language understanding.

BRIEF DESCRIPTION OF THE DRAWINGS

The above and other aspects, features and advantages of certain embodiments of the present disclosure will be more apparent from the following description, taken in conjunction with the accompanying drawings, in which.

DETAILED DESCRIPTION

Hereinafter, the disclosure will be described in detail with reference to the accompanying drawings.

Figure 1:
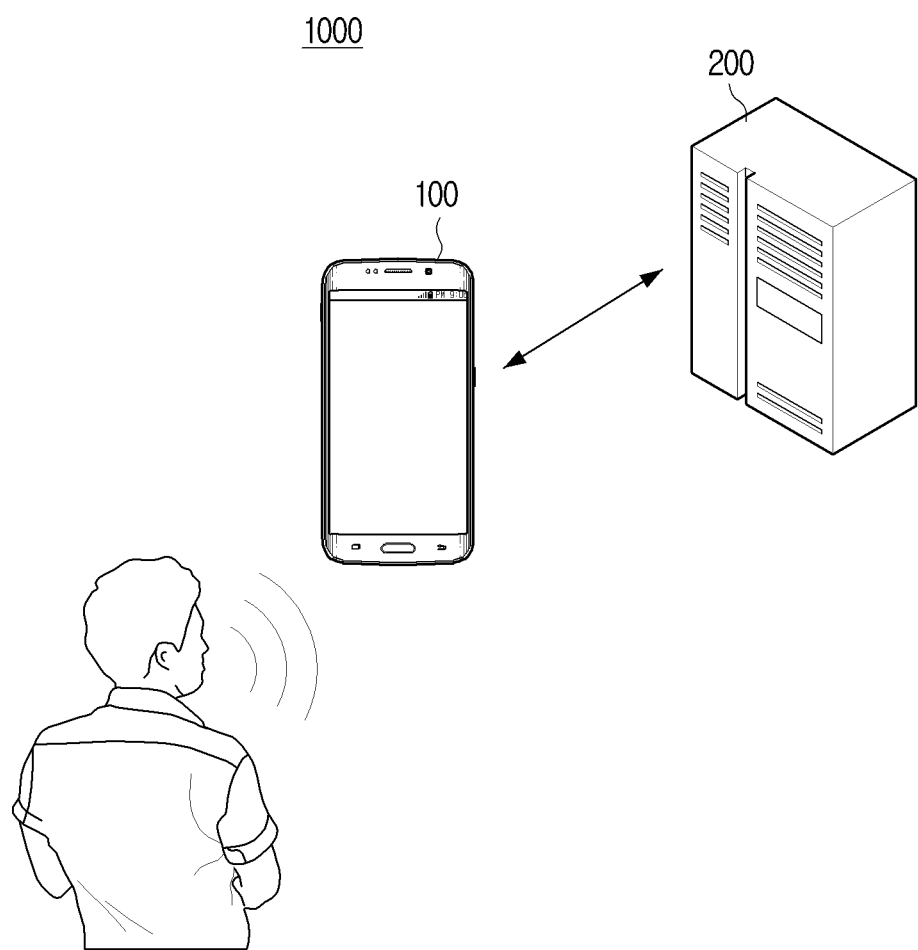
FIG. 1 is a diagram for describing a configuration of an electronic system according to an embodiment.

FIG. 1 is a diagram for describing a configuration of an electronic system 1000 according to an embodiment.

Referring to FIG. 1, an electronic system 1000 according to an embodiment includes an electronic apparatus 100 and a server 200.

The electronic apparatus 100 may be implemented or configured to perform natural language understanding of a user's voice using an artificial intelligence model (or a neural network model, a learning or trained network model, etc.), and perform a function of an application based on a result of the performed natural language understanding. Here, the natural language understanding refers to grasping or understanding a user's intention included in a natural language that is used routinely without following only the rules in which the phraseology is set, unlike an artificial language such as a programming language. The artificial intelligence model performing such natural language understanding is collectively referred to as a natural language understanding model.

The functions related to the artificial intelligence according to an embodiment are operated through a processor (e.g., at least one processor) and a memory (e.g., at least one memory). The processor may be configured as one or a plurality of processors. At this time, one or the plurality of processors may be a general-purpose processor such as a central processing unit (CPU), an application processor (AP), a digital signal processor (DSP), a graphic-dedicated processor such as a graphics processing unit (GPU) or a vision processing unit (VPU), or an artificial intelligence dedicated processor such as a neural processing unit (NPU). One or the plurality of processors perform a control to process input data according to predefined operating rules or artificial intelligence models stored in the memory. Alternatively, when one or the plurality of processors are an artificial intelligence dedicated processor, the artificial intelligence dedicated processor may be designed in a hardware architecture specialized for the processing of a specific artificial intelligence model.

The predefined operating rules or artificial intelligence models are characterized by being created (or updated) through learning (or training). Here, the creating through learning means that a basic artificial intelligence model is learned (or trained) by using a plurality of learning data (or training data) by a learning algorithm (or training algorithm), thereby creating the predefined operation rules or artificial intelligence models set to perform a desired characteristic (or purpose). Such a learning may be performed in a device itself in which the artificial intelligence according to an embodiment is performed, or may also be performed through a separate server and/or system. An example of the learning algorithm includes supervised learning, unsupervised learning, semi-supervised learning, or reinforcement learning, but the learning algorithm is not limited to the examples described above.

The artificial intelligence model may include a plurality of neural network layers. Each of the plurality of neural network layers has a plurality of weight values and performs a neural network operation through an operation between an operation result of a previous layer and the plurality of weights. The plurality of weight values of the plurality of neural network layers may be optimized by a learning result of the artificial intelligence model. For example, the plurality of weight values may be updated so that a loss value or a cost value acquired from the artificial intelligence model is reduced or minimized during a learning process. The artificial neural network may include a deep neural network (DNN), a convolutional neural network (CNN), a recurrent neural network (RNN), a restricted boltzmann machine (RBM), a deep belief network (DBN), a bidirectional recurrent deep neural network (BRDNN), or deep Q-networks, but is not limited thereto.

According to an embodiment, assuming that the artificial intelligence model is a natural language understanding model, the electronic apparatus 100 includes a natural language understanding model that grasps a user's intention, and may further provide a virtual secretary function (or operation) therethrough. The electronic apparatus 100 may be implemented in various forms such as a smartphone, a tablet personal computer (PC), a mobile phone, an image phone, an e-book reader, a desktop personal computer (PC), a laptop personal computer (PC), a netbook computer, a workstation, a server, a personal digital assistant (PDA), a portable multimedia player (PMP), an MP3 player, a medical device, a camera, a wearable device, etc.

Such a natural language understanding model may exist separately according to an application, and one or a plurality of natural language understanding models corresponding to one application may exist. Because an operation performed for each of different applications may be different, the contents of a user's voice utterance input for each application may also be different. Accordingly, the natural language understanding model may be a model specialized for a corresponding application. In addition, the natural language understanding model may be divided into a personal model and a public model. Here, the personal model is a model generated or learned based on a user's voice utterance of the electronic apparatus 100, and may be a model personalized to the user of the electronic apparatus 100. In addition, the public model may be a model generated or learned based on voice utterances of a plurality of users (e.g., a plurality of public users).

The server 200 is an apparatus for managing a plurality of natural language understanding models, and may be implemented as a central server or a cloud server.

According to an embodiment, the server 200 may transmit a corresponding natural language understanding model to the electronic apparatus 100 based on a request of the electronic apparatus 100. In particular, the server 200 may transmit a pre-learned public model to the electronic apparatus 100 based on public user data, and may also transmit the personal model to the electronic apparatus 100.

According to another embodiment, the natural language understanding model may be generated on the electronic apparatus 100 based on resource information included in an application installed on the electronic apparatus 100. Here, the resource information may include information on a predetermined voice utterance, operation information corresponding to the predetermined voice utterance, condition information for generating a natural language understanding model, functional information of an application corresponding to the predetermined voice utterance, and the like.

The electronic apparatus 100 may generate or learn the natural language understanding model based on the resource information received from the server 200. In addition, the electronic apparatus 100 may receive an operation list and a slot list from the server 200 and learn the public model as the personal model. This is described in detail below with reference to the drawings.

According to various embodiments, when (or based on) the natural language understanding model is acquired on the electronic apparatus 100, an operation corresponding to the user's voice may be performed based on the acquired natural language understanding model.

Further, according to various embodiments, because the electronic apparatus 100 acquires (or obtains) a natural language understanding model corresponding to an operation of an application frequently used by the user, it is not necessary to store all natural language understanding models in the electronic apparatus 100. Therefore, even on an electronic apparatus having a small memory capacity, natural language understanding of the user's voice may be efficiently performed.

In addition, because the natural language understanding model is acquired in advance in the electronic apparatus 100 according to the frequency of use of the application, there is no need to download the natural language understanding model from an external server in real time, thereby making it possible to efficiently perform the natural language understanding of the user's voice even when there is no network connection.

Figure 2:
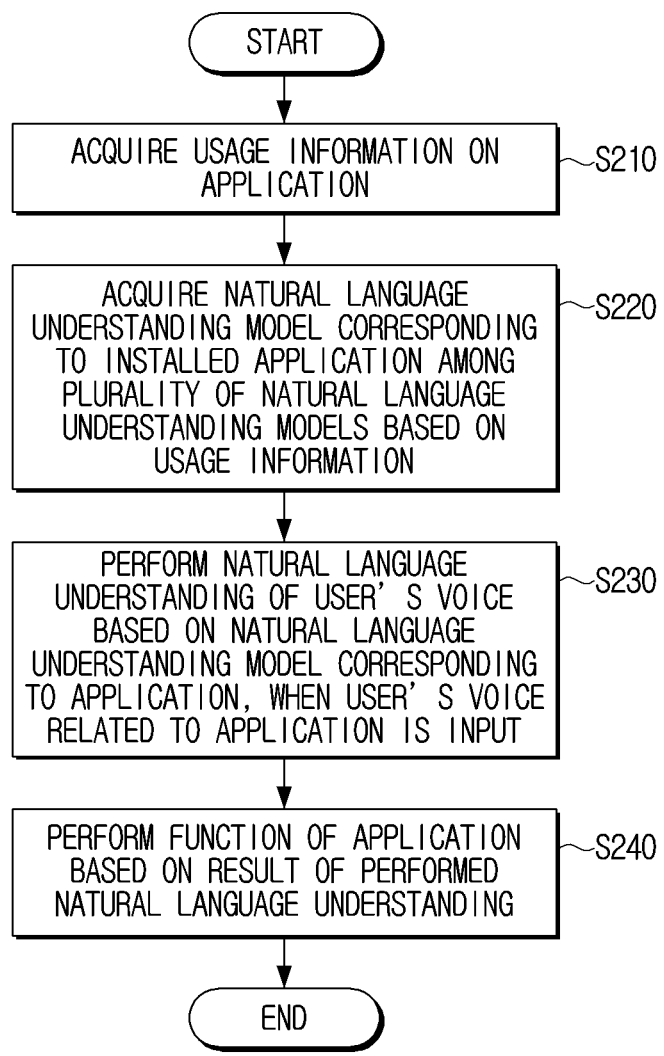
FIG. 2 is a diagram illustrating a flowchart for a process of acquiring a natural language understanding model to perform natural language understanding according to an embodiment.

FIG. 2 is a diagram illustrating a flowchart for a process of acquiring a natural language understanding model to perform a function (or operation) of an application according to an embodiment.

Referring to FIG. 2, the electronic apparatus 100 may acquire usage information on an application installed on the electronic apparatus 100 (operation S210). Here, the usage information may include at least one of user input information related to the application and usage information of the application according to a user input. For example, the usage information may include at least one of information on the number of user inputs for executing the application, information on operations executed in the application, time information when the application is executed, etc.

According to an embodiment, the user input may include an input by a pen or a user touch. For example, the user input may be a user touch input for an application icon or an icon performing a function included in the application, in order to execute the application or the function included in the application.

According to another embodiment, the user input may include a user input that is input through a virtual secretary. As an example, according to a user input by a user voice, a user touch, a touch by a pen, or the like while a virtual secretary service is executed, an operation corresponding to the user input may be performed.

Here, the virtual secretary service refers to a service for performing voice recognition on an input user voice using an artificial intelligence model, grasping (or determining) a user's intention, and providing response information corresponding to the user voice as a result. In addition, the virtual secretary service may be provided as a dedicated program to be distinguished from other software (SW), and may be implemented to execute the AI model through a separate AI-dedicated processor. When the virtual secretary service (or virtual assistant service) uses a plurality of artificial intelligence models, some artificial intelligence models may be implemented to be executed through the AI-dedicated processor.

As another example, the electronic apparatus 100 may acquire information on the application operation executed according to the user input. At this time, the information on the application operation may include information on the type of application operation, information on execution time, information on the number of executions, and the like.

A usage information monitoring module included in the electronic apparatus 100 may monitor the usage information based on the user input and store the acquired usage information in the memory.

The electronic apparatus 100 may acquire a natural language understanding model corresponding to an installed application among a plurality of natural language understanding models based on the usage information (operation S220). Specifically, if the number of executions of the application is greater than or equal to a threshold number (e.g., a preset or predetermined threshold number), and/or if the execution time is greater than or equal to a threshold time (e.g., a preset or predetermined threshold time), the electronic apparatus 100 may acquire the natural language understanding model corresponding to the installed application. In other words, the electronic apparatus 100 may acquire a natural language understanding model for an application frequently used by the user, and may efficiently process a user's voice input.

According to an embodiment, the electronic apparatus 100 may receive and acquire a natural language understanding model corresponding to the application identified based on the usage information from the server 200. This is described in detail with reference to FIG. 3B.

According to another embodiment, the electronic apparatus 100 may also generate the natural language understanding model corresponding to the application identified based on the usage information on the electronic apparatus 100. This is described in detail with reference to FIG. 4B.

In addition, the electronic apparatus 100 may acquire resource information corresponding to the application operation based on the number of executions or execution time of the application operation, as well as the number of executions or execution time of the application, and may acquire a natural language understanding model learned (or trained) based on the acquired resource information. Specifically, if the number of executions of the application operation is greater than or equal to a threshold number, and/or if the execution time is greater than or equal to a threshold time, the electronic apparatus 100 may acquire the resource information corresponding to the executed application operation and acquire the natural language understanding model learned based on the acquired resource information.

When (or based on) a user's voice related to the application is input, the electronic apparatus 100 may perform natural language understanding for the user's voice based on the natural language understanding model corresponding to the application (operation S230). Here, the natural language understanding model corresponding to the application may be the model acquired in operation S220.

Specifically, the natural language understanding module may grasp a user's intent by performing syntactic analysis or semantic analysis for the user's voice. Accordingly, the natural language understanding model may obtain a domain, an intent, or a parameter (or slot) required to represent the intent of the user input. Here, the domain may refer to a category classified according to a subject of the user's voice or the type of control command corresponding to the user's voice, and may be, for example, a kind or type of application that is targeted by the user's voice. Such a domain may be identified by a domain classifier model. As an example, if the user's voice is input, the domain classifier model may identify an application corresponding to the user's voice. For example, when "Turn on selfie capturing mode of A camera application" is input via the user's voice, the domain classifier model may identify "A camera application" of the user's voice input as a region representing the domain. That is, the domain classifier model may identify the domain of the corresponding user's voice as "A camera application." By way of another example, if the user's voice is input, the domain classifier model may identify a wide range of categories related to the user's intent. For example, the domain classifier model may identify whether a category related to the user's intent is related to a schedule, a message, or a reminder.

Thereafter, the natural language understanding model may perform natural language understanding included in the user's voice based on the identified domain.

The electronic apparatus 100 may perform the function of the application based on a result of the performed natural language understanding (operation S240). For example, when (or based on) the result of the natural language understanding model is to execute the camera application "A," the electronic apparatus 100 may execute the A camera application.

Figure 3A:
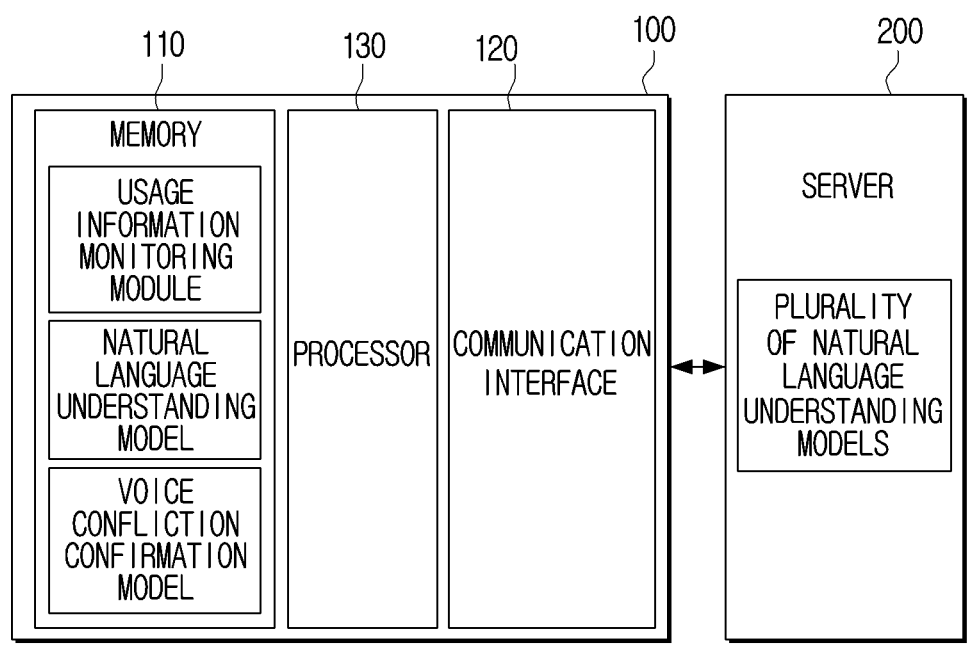
FIG. 3A is a block diagram of a case in which a natural language understanding model is received from a server according to an embodiment.

FIG. 3A is a block diagram of a case in which the natural language understanding model is received from a server 200 according to an embodiment.

The electronic apparatus 100 may include a memory 110 (e.g., at least one memory), a communication interface 120 (e.g., at least one communication interface), and a processor 130 (e.g., at least one processor).

The memory 110 may be electrically connected to the processor 130 and store data used in various embodiments (e.g., instructions executable by the processor 130).

According to an embodiment, the memory 110 may store a usage information monitoring module (e.g., instructions) and a voice confliction confirmation module (e.g., instructions). The memory 110 may also store the natural language understanding model transmitted by the server 200. In addition, the memory 110 may also include the domain classifier model.

Here, the usage information monitoring module may be a module that monitors user input information related to an application and usage information of an application according to user input. In addition, the usage information monitoring module may monitor usage information on domain and intent information related to the user's voice acquired through the artificial intelligence model of the virtual secretary service.

According to an example, the usage information monitoring module may monitor usage information on the application. Specifically, the usage information monitoring module may monitor the number of times a corresponding operation is performed and the time the application is executed by touching an application icon or an icon performing a function included in the application by a pen or a user's body (e.g., a finger).

According to another example, the usage information monitoring module may monitor usage information on the virtual secretary. As an example, if the user's voice is input, a voice recognition model among the artificial intelligence models of the virtual secretary service may convert the user's voice into text. In addition, if the user's voice is converted into the text, at least one domain related to the user's voice may be identified through the domain classifier model included in the natural language understanding model among the artificial intelligence models of the virtual secretary service. Here, the domain may be information related to the application. For example, the domain may refer to the application itself or a category of the application. That is, a domain of an A application related to music may be the A application itself or a music category.

The usage information monitoring module may monitor the number of times a specific domain is identified through the artificial intelligence model of the virtual secretary service, and may transmit identification information on a corresponding domain to the server 200 when (or based on) the number of times one domain is identified is greater than or equal to a threshold number. The identification information on the domain may refer to information that may identify one domain to be distinguished from other domains, and may include at least one of a name (title) of the domain, identification (ID) information, an identifier, and the like. Accordingly, the electronic apparatus 100 may receive a natural language understanding model corresponding to the corresponding domain from the server 200. Alternatively, the server 200 may request the electronic apparatus 100 to transmit information on the number of identifications of the domain at a predetermined period. In this case, the electronic apparatus 100 may transmit the information on the number of identifications of the domain to the server 200 even when the number of identifications of the domain is less than the threshold number, and the server 200 may accumulate the information on the number of identifications of the domain periodically received to determine whether the number of identifications of the domain is the threshold number or more. When (at the time, in response to or based on) it is determined that the number of identifications of a specific domain is the threshold number or more, the server 200 may transmit a natural language understanding model corresponding to the corresponding domain to the electronic apparatus 100.

As another example, after at least one domain related to the user's voice is identified through the domain classifier model, natural language understanding of the text corresponding to the user's voice may be performed through the natural language understanding model among the artificial intelligence models of the virtual secretary service to acquire the user's intent information corresponding to the user's voice.

The usage information monitoring module may monitor the number of times specific intent information is identified through the artificial intelligence model of the virtual secretary service, and may transmit identification information on the corresponding intent information to the server 200 when the number of times one intent information is identified is greater than or equal to a threshold number. The identification information on the intent information may refer to information that may identify one intent information to be distinguished from other intent information, and may include at least one of a name (title) of the intent information, identification (ID) information, an identifier, and the like. Accordingly, the electronic apparatus 100 may receive a natural language understanding model corresponding to the corresponding intent from the server 200. Alternatively, the server 200 may request the electronic apparatus 100 to transmit usage information on the intent information at a predetermined period or based on a predetermined event. In this case, the electronic apparatus 100 may transmit the identification information on the intent information to the server 200 even when the number of identifications of the intent information is less than the threshold number, and the server 200 may accumulate the identification information on the intent information periodically received to determine whether the number of identifications of the intent information is greater than or equal to the threshold number. When it is determined that the number of identifications of the intent information is greater than or equal to the threshold number, the server 200 may transmit a natural language understanding model corresponding to the corresponding intent information to the electronic apparatus 100.

In other words, the usage information monitoring module may acquire the usage information on the domain and intent information identified in the virtual secretary service even before the application is executed. As the usage information on the domain and intent information is transmitted to the server 200, a natural language understanding model corresponding to the domain and intent information may be received from the server 200 regardless of execution of the application.

As another example, the usage information monitoring module may monitor the number of executions of the application through the virtual secretary or the number of executions of the function included in the application. For example, the virtual secretary model may store usage information based on the user input in the memory 110 or a separate memory connected to the virtual secretary, and the usage information monitoring module may acquire the stored usage information.

Meanwhile, in the above-described embodiment, the usage information monitoring module has been described as monitoring based on the domain information or intent information, but this is only an example. By way of another example, the usage information monitoring module may monitor operation information of the application. That is, the usage information monitoring module may monitor the number of times operation information of an application corresponding to the user input is identified, and may transmit identification information on the corresponding operation information and identification information on the application performing the corresponding operation information to the server 200 when the number of times one operation information is identified is greater than or equal to a threshold number. The identification information on the operation information may refer to information that may identify one operation to be distinguished from other operations, and may include at least one of a name (title) of the operation information, identification (ID) information, slot information included in the operation, and the like. Accordingly, the electronic apparatus 100 may receive resource information and application information corresponding to the corresponding operation from the server 200, and may learn or generate the natural language understanding model based on the resource information and the application information received from the server 200. Alternatively, the server 200 may learn or generate the natural language understanding model based on the identification information of the operation and the identification information of the application received from the electronic apparatus 100, and transmit the learned or generated natural language understanding model to the electronic apparatus 100.

Alternatively, the server 200 may request the electronic apparatus 100 to transmit usage information on the operation information at a predetermined period or based on a predetermined event. In this case, the electronic apparatus 100 may transmit the identification information on the operation information to the server 200 even when the number of identifications of the operation information is less than the threshold number, and the server 200 may accumulate the identification information on the operation periodically received to determine whether the number of identifications of the operation information is greater than or equal to the threshold number. When it is determined that the number of identifications of the operation information is greater than or equal to the threshold number, the server 200 may transmit the resource information or natural language understanding model corresponding to the corresponding operation information to the electronic apparatus 100.

Meanwhile, the usage information monitoring module is described above as being included in the electronic apparatus 100, but the usage information monitoring module may also be included in the server 200. In particular, when the natural language understanding of the user's voice is performed in the server 200, the server 200 may also monitor the usage information on the application through the usage information monitoring module.

Specifically, when the user's voice is input to the electronic apparatus 100, the electronic apparatus 100 may acquire text corresponding to the user's voice through the voice recognition model. At this time, the text corresponding to the user's voice may be acquired through the voice recognition model existing in the electronic apparatus 100, but this is only an example, and the text may be acquired through a voice recognition model of another server.

In addition, the electronic apparatus 100 may transmit the text acquired for natural language understanding to the server 200. The server 200 may use the acquired text as input data of the domain classifier model included in the natural language understanding model. The server 200 may acquire domain or intent information related to the text acquired through the domain classifier model. However, the server 200 is not limited thereto, and may receive the user's voice from the electronic apparatus 100 and acquire the text corresponding to the user's voice through the voice recognition model provided in the server 200 as described above. Meanwhile, the electronic apparatus 100 transmits the user's voice or the text corresponding to the user's voice to the server 200 as follows.

As an example, it is assumed that the domain classifier model of the electronic apparatus 100 does not identify the domain from the text corresponding to the user's voice input to the electronic apparatus 100. In this case, the electronic apparatus 100 may transmit the user's voice or the text corresponding to the user's voice to the server 200. When the domain for the user's voice or the text received from the electronic apparatus 100 is identified through the domain classifier model of the server 200, the usage information monitoring module of the server 200 may monitor the number of identifications for each domain, that is, usage information on the domain for each domain. In addition, when the intent information on the user's voice or the text is identified after domain identification, the usage information monitoring module of the server 200 may monitor the number of identifications for each intent information, that is, usage information on the intent information for each intent information.

As another example, when the domain is identified through the domain classifier model of the electronic apparatus 100 from the text corresponding to the user's voice input to the electronic apparatus 100, but the intent information is not identified, the electronic apparatus 100 may transmit the identified domain information and the user's voice or the text to the server 200. The server 200 may identify intent information on the user's voice based on the received domain information and the user's voice or text. In addition, the usage information monitoring module of the server 200 may monitor the number of identifications for each intent information, that is, usage information on the intent information for each intent information.

As described above, when the domain or intent information is identified in the server 200, the usage information monitoring module of the server 200 may acquire usage information on the domain or intent information. In this case, the usage information monitoring module of the server 200 may sum up the usage information previously received from the electronic apparatus 100 and the usage information acquired from the server 200. Accordingly, the server 200 may identify a natural language understanding model corresponding to the summed usage information, and transmit the identified natural language understanding model to the electronic apparatus 100.

Because the natural language understanding model related to the user's voice or the text corresponding to the user's voice is not included in the electronic apparatus 100, the electronic apparatus 100 may request the server 200 to identify the domain or intent information related to the user's voice (or text) as described above. In addition, the electronic apparatus 100 may include a natural language understanding model corresponding to the user's voice (text) received from the server 200. In this case, when the user's voice (or text) related to the natural language understanding model received from the server 200 is input to the electronic apparatus 100, the electronic apparatus 100 may identify the domain or intent information related to the user's voice, and may thus not separately request identification of the domain or intent information to the server 200.

In other words, the electronic apparatus 100 may identify the domain related to the user's voice or text corresponding to the user's voice through the domain classifier model of the electronic apparatus 100, and when the intent information within the domain, that is, information on a specific function of the application is identified, the electronic apparatus 100 may not separately request identification of the domain or intent information from the server 200, and may transmit the acquired usage information to the server 200 when a predetermined condition is satisfied or at the request of the server 200.

The voice confliction confirmation module is a module that confirms whether there is a confliction on the basis of the similarity to a previously-registered user's voice or text corresponding to the user's voice, when a user's voice corresponding to a predetermined operation for the application or text corresponding to the user's voice is newly registered. In other words, the voice confliction confirmation module is a module that may confirm whether there is a confliction of the text as well as the voice. This is described in detail below.

The communication interface 120 includes circuitry and is a component capable of communicating with the server 200.

The communication interface 120 may transmit usage information to the server 200 through wired or wireless communication, and receive a natural language understanding model corresponding to the identified application based on the usage information from the server 200. In this case, the communication interface 120 may transmit identification information of the electronic apparatus 100 as well as the usage information under the control of the processor 130. Here, the identification information may include at least one of an Internet Protocol (IP) address, model name, device name, and serial number of the electronic apparatus 100. The server 200 may determine a target for transmitting the natural language understanding model based on the transmitted identification information.

The processor 130 is electrically connected to the memory 110 and controls an overall operation of the electronic apparatus 100. The processor 130 generally controls operations of the electronic apparatus 100 using various instructions or programs stored in the memory 110. In particular, according to an embodiment, a main CPU may copy the program to a random access memory (RAM) according to the instructions stored in a read-only memory (ROM), and access the RAM to execute the program. Here, the program may include a natural language understanding model or the like.

The processor 130 may load the usage information monitoring module, the natural language understanding model, the voice confliction confirmation module, and the domain classifier model stored in the memory 110 into the processor 130. For example, the processor 130 may load the usage information monitoring module, the natural language understanding model, the voice confliction confirmation module, and the domain classifier model stored in the memory 110 outside the processor 130 into a memory inside the processor 130. Meanwhile, a process in which the electronic apparatus 100 receives a natural language understanding model from the server 200 based on usage information on the application is described in detail with reference to FIG. 3B below.

Figure 3B:
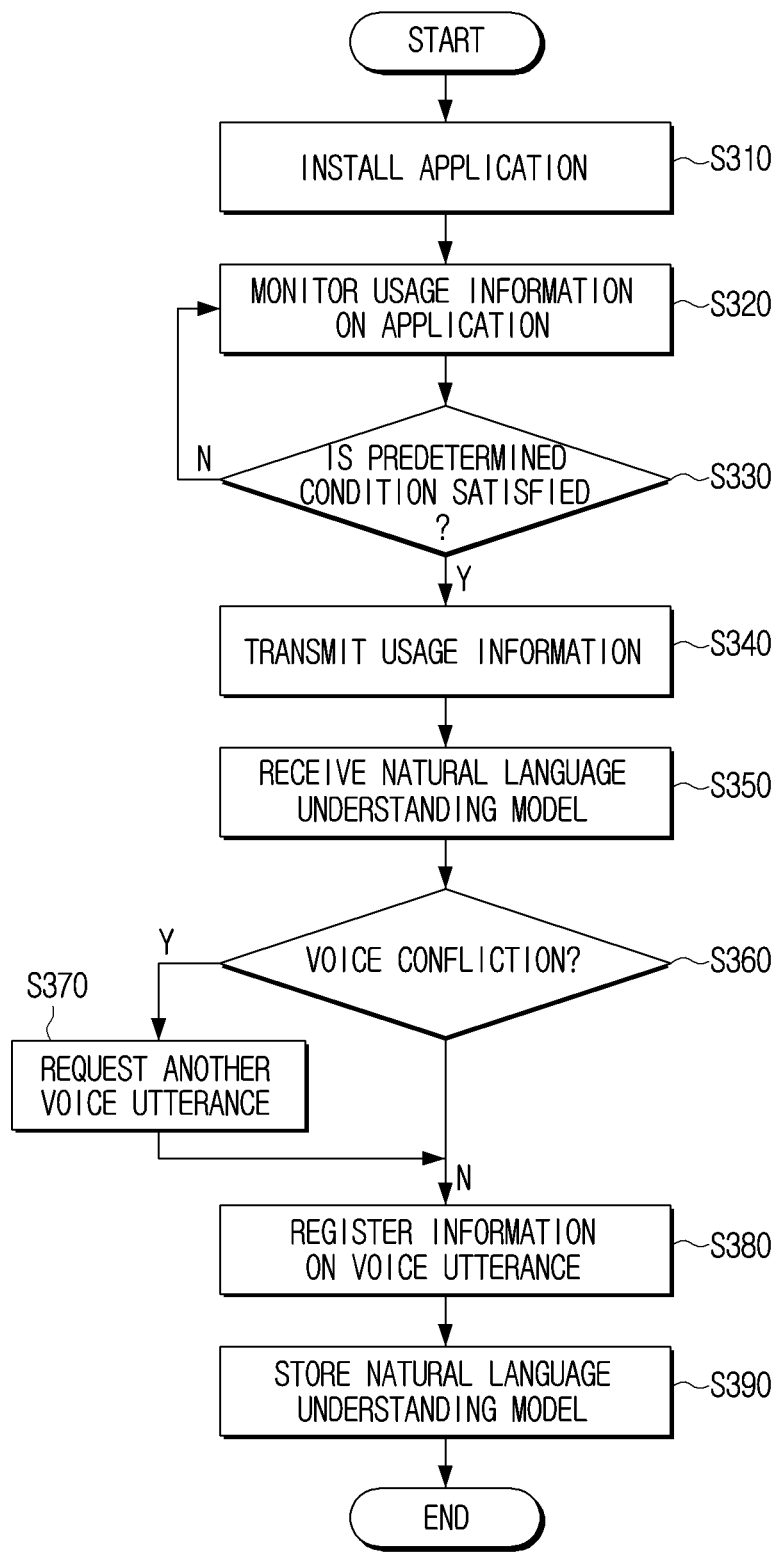
FIG. 3B is a diagram for describing a process in which a natural language understanding model is received from a server according to an embodiment.

FIG. 3B is a diagram for describing a process in which the natural language understanding model is received from the server according to an embodiment of the disclosure.

An application may be installed in the electronic apparatus 100 (operation S310). The application may be installed at the time of manufacturing the electronic apparatus 100, such as a built-in application, or may be installed by user's selection.

Thereafter, the usage information monitoring module may monitor usage information on the installed application (operation S320). In addition, the usage information monitoring module may monitor usage information on domain and intent information related to the user's voice acquired through the artificial intelligence model of the virtual secretary service.

The usage information monitoring module may monitor user input information related to an application and usage information of an application according to user input. For example, the usage information monitoring module may monitor the number of times a delivery food application "B" is executed according to the user input. The case where the B delivery food application is executed according to the user input may include a case where the B delivery food application is selected and executed by a user touch or pen on a display and a case where the B delivery food application is executed by a user's voice. In this case, the domain classifier model may identify information that a domain included in the user's voice is the B application. For example, the "B application" may be directly included in the user's voice, or may not be directly included in the user's voice but instead words regarding delivery may be included (such as "I want to order deliver food" or "Please order delivery food"). In the latter case, the domain classifier model may identify the domain of the user's voice as the B application based on the "delivery" included in the user's voice.

In addition, the usage information monitoring module may monitor the number of times a specific domain is identified through the artificial intelligence model of the virtual secretary service. For example, when a user's voice for "B application" is input through a virtual secretary, the user's voice for "B application" may be converted into text through the voice recognition model. The domain classifier model among the artificial intelligence models of the virtual secretary service may identify the domain related to the user's voice as "B application" using the converted text as input data. The usage information monitoring module may monitor the number of times of the domain identified as described above, that is, usage information on the domain.

Alternatively, the usage information monitoring module may monitor the number of identifications of intent information. For example, the user's intent information may be identified as selecting a Chinese menu of "B application," which is a food delivery application. The usage information monitoring module may monitor the number of times of the intent information identified as described above, that is, usage information on the intent information.

Alternatively, the usage information monitoring module may monitor the number of identifications of operation information. For example, when the user's operation information is a photo capturing operation of an A camera application, the usage information monitoring module may identify "CapturePhoto" and "A camera application" that is information on an application that executes the operation as the operation information. In addition, the usage information monitoring module may monitor the number of times of the operation information identified as described above, that is, usage information on the operation information.

The usage information monitoring module may store the acquired usage information in the memory 110. The usage information monitoring module may store changed (or updated) usage information in the memory 110 whenever there is a change in usage information, or periodically store the usage information in the memory 110.

The usage information monitoring module may identify whether the monitored usage information satisfies a predetermined condition (operation S330).

If the usage information satisfies the predetermined condition (Y in operation S330), the usage information monitoring module may transmit the usage information to the server 200 through the communication interface 120 (operation S340). For example, when a B application is executed three or more times, or an accumulated time when the B application is executed is 1 hour or more, the usage information monitoring module may transmit usage information on the B application to the server 200. Here, the usage information may include at least one of information of the application to be executed, the number of executions of the B application, the execution time of the B application, etc. For example, information on the number of executions of which the number of executions is 5 and identification information that the executed application is B may be transmitted to the server 200 together. In addition, the usage information monitoring module may also transmit identification information of the electronic apparatus 100 to the server 200. Here, the identification information may include at least one of the IP address, model name, device name, and serial number of the electronic apparatus 100. The server 200 may determine a target for transmitting the natural language understanding model based on the transmitted identification information.

As another example, when a domain related to the B application is identified three or more times, or when intent information for selecting a specific function in the B application is identified three or more times, the usage information monitoring module may transmit identification information on the domain or intent information to the server 200.

In other words, the predetermined condition may be a condition related to the usage information on the application or the usage information on the domain and intent information in the virtual secretary service. However, the predetermined condition is not limited thereto, and may be an occurrence of a predetermined event or an arrival of a predetermined time. For example, the usage information monitoring module may transmit the acquired usage information to the server 200 every 50 hours. In addition, the server 200 accumulates and stores received usage information, and when the number of executions of the application, the number of identifications of the domain, or the number of identifications of the intent information is greater than or equal to a threshold number based on the accumulated usage information, the server 200 may also transmit a natural language understanding model corresponding thereto to the electronic apparatus 100.

As another example, when it is identified that an operation of a C application is executed three or more times, the usage information monitoring module may transmit operation information and information on an application that executes the operation to the server 200.

Meanwhile, if the usage information does not satisfy the predetermined condition (N in operation S330), the usage information monitoring module may continue to monitor the usage information on the application or the usage information on the domain and intent information in the virtual secretary.

Meanwhile, the usage information monitoring module periodically confirms whether the usage information satisfies the predetermined condition, or the server 200 may also transmit a request signal to confirm whether the usage information satisfies the predetermined condition to the electronic apparatus 100.

The server 200 may identify whether an application executed on the electronic apparatus 100 is included among one or more applications managed by the server 200 based on the usage information. Specifically, the server 200 identifies whether the application identified by the domain classifier model of the electronic apparatus 100 is an application managed by the server 200. If it is identified that the application executed on the electronic apparatus 100 is managed by the server 200, the server 200 may transmit a natural language understanding model corresponding to a corresponding application among the plurality of natural language understanding models to the electronic apparatus 100. For example, if a natural language understanding model corresponding to the B application is identified among the plurality of natural language understanding models, the server 200 may transmit the identified natural language understanding model to the electronic apparatus 100.

As an example, the server 200 may transmit a natural language understanding model corresponding to a specific function operation (or function) to the electronic apparatus 100 based on the usage information transmitted from the electronic apparatus 100 among the natural language understanding models corresponding to the corresponding application. For example, when the A camera application is executed according to the user input, and a selfie is frequently captured through the A camera application, the server 200 may transmit a natural language understanding model for a selfie operation of the A camera application to the electronic apparatus 100 based on the usage information including such a usage history.

The processor 130 may receive the natural language understanding model transmitted from the server 200 through the communication interface 120 (operation S350). At this time, the received natural language understanding model may be a public model. The received natural language public understanding model may include information on a predetermined voice utterance and operation information corresponding to the voice utterance. For example, the received natural language public understanding model may include information on voice utterances such as "Turn on A application," "A application," or the like, and operation information executing the A application in response thereto. At this time, the processor 130 may receive the natural language understanding model itself, but may also acquire resource information for learning or generating the natural language understanding model.

The voice confliction confirmation module may confirm whether there is a confliction (or conflict) between the information on the voice utterance included in the natural language understanding model and previously-registered user voice information (operation S360). Here, each of the information on the voice utterance and the previously-registered user voice information includes a voice or text corresponding to the voice.

As an example, when text corresponding to the voice utterance and text corresponding to the previously-registered user voice are acquired through the voice recognition model, the voice confliction confirmation module may confirm whether there is a confliction between the text corresponding to the voice utterance and the text corresponding to the previously-registered user voice.

For example, in a case in which the previously-registered user voice is a pronunciation similar to "A application," or the same name but different application A exists on the electronic apparatus 100, different operations may correspond to the voice "A application" or the text corresponding to the voice. As such, if the voice confliction is confirmed (Y in operation S360), the voice confliction confirmation module may request another voice utterance corresponding to "operation of executing the A application" (operation S370). Accordingly, when another voice utterance is newly input to execute the A application, the voice confliction confirmation module may re-confirm the newly input voice or text corresponding to the voice to confirm whether the input voice utterance conflicts with the previously-registered user voice. If it is identified that there is no voice confliction, the voice confliction confirmation module may register information on the newly input user voice or text corresponding to the user voice as voice or text mapped to "operation of executing the A application." At this time, the processor 130 may display a user interface (UI) for registering another voice utterance, and may register information on another voice utterance input through the UI.

According to another example, if the number of executions of the application is greater than or equal to a threshold number or the execution time of the application is greater than or equal to a threshold time, that is, if the predetermined condition is satisfied, the electronic apparatus 100 may request a user's voice corresponding to a specific operation of the application. The voice confliction confirmation module may identify whether the input user's voice conflicts with the previously-registered user voice stored in the memory 110 when the user's voice is input according to the request, request a voice different from the input user's voice when the input user's voice conflicts with the previously-registered user voice, and map the input user's voice to the operation of the application and store it in the memory 110 when the previously-registered voice that conflicts with the input user's voice is not identified.

Meanwhile, if it is identified that the information on the voice utterance included in the natural language understanding model does not conflict with the previously-registered user voice information (N in operation S360), the voice confliction confirmation module may register the information on the voice utterance (operation S380).

It is understood, however, that one or more other embodiments are not limited thereto. For example, according to another embodiment in which the natural language understanding model is transmitted from the server 200, whether or not there is the voice confliction is confirmed on the server 200 in advance and an operation of separately confirming the voice confliction on the electronic apparatus 100 may also be omitted.

The processor 130 may store the natural language understanding model in the memory 110 (operation S390). At this time, the stored natural language understanding model may be a user-specified personal model. Thereafter, if the user's voice is input, the processor 130 may load the natural language understanding model stored in the memory 110 into the processor 130 to grasp a user's intent included in the user's voice based on the natural language understanding model.

Meanwhile, according to another embodiment, if an application is installed on the electronic apparatus 100, the electronic apparatus 100 may request a natural language understanding model corresponding to the application from an external server. In other words, if the application is installed on the electronic apparatus 100 regardless of the usage information on the application or the information on the number of identifications on a specific domain or specific intent information, the electronic apparatus 100 may request the natural language understanding model corresponding to the installed application from the external server. Further, and by way of example, if the usage information on the application does not satisfy a predetermined condition (e.g., a number of uses or a number of user voice inputs within a predetermined time period after installation), the natural language understanding model may be deleted from the electronic apparatus 100.

Figure 4A:
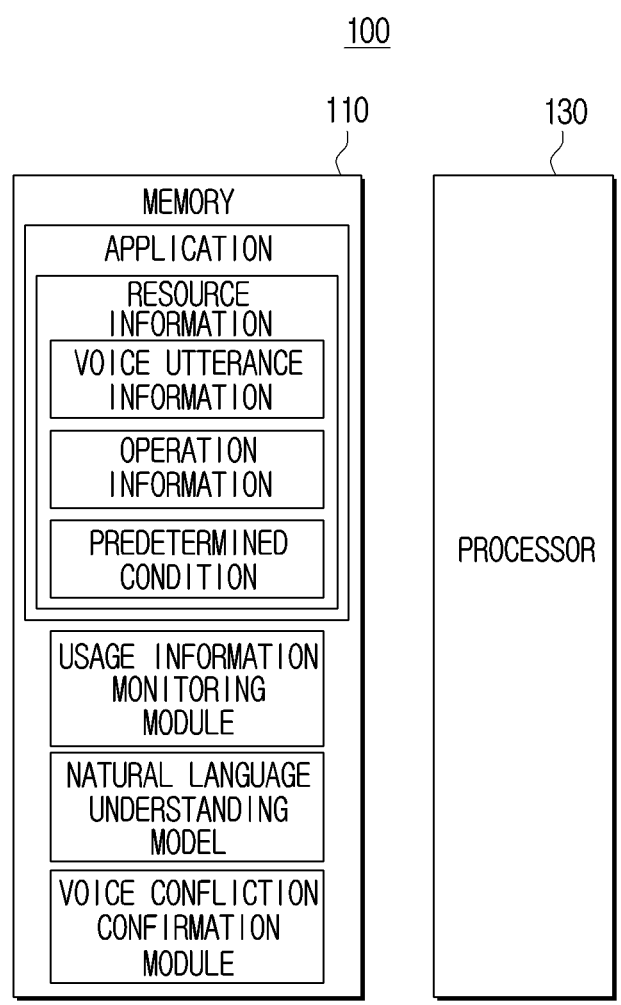
FIG. 4A is a block diagram of a case in which a natural language understanding model is generated according to another embodiment.

FIG. 4A is a block diagram of a case in which a natural language understanding model is generated according to another embodiment.

If an application is installed on the electronic apparatus 100, the application may be stored in the memory 110. The processor 130 may generate a natural language understanding model based on resource information included in the application. As illustrated in FIG. 4A, the resource information may include at least one of voice utterance information, operation information, information on a predetermined condition, and the like. Here, the voice utterance information may be a representative utterance defined by a developer, and the voice utterance information may include slot information. The slot information may be used as a parameter of an execution function. The operation information may refer to an event to be monitored. The information on the predetermined condition may refer to a natural language understanding module corresponding to the application or a condition for registering a predetermined utterance. In addition, the resource information may further include execution function information, and the execution function information may store information on a function of the application to be connected to the corresponding utterance.

The resource information may be matched to information on a predetermined voice utterance, operation information corresponding to the predetermined voice utterance, condition information for generating a natural language understanding model, and function information of an application corresponding to the predetermined voice utterance, respectively, and stored in a template form. For example, as illustrated in Table 1 below, the resource information may be stored in the memory 110.

TABLE 1

| Representative Utterance | Action Description | Trigger Condition | Execution Function |
|---|---|---|---|
| Take a Photo | ACTION_IMAGE_CAPTURE | >Uses 3 times after installation | startActivityForResult (new Intent(MediaStore.AC-TION_IMAGE_CAPTURE) |
| Save in Family Album[Entity_AlbumName] | ACTION_IMAGE_SAVE_[Entity_AlbumName] | >Uses 5 times after installation | savePhto (Entity_AlbumName) |

The resource information may be included in application data when the application is installed. In addition, the memory 110 may store an operation list and a slot list based on actions and slots (or entities) defined in the public model in order to expand a coverage of the public model. The operation list may be stored by matching at least one representative utterance corresponding to the operation, as illustrated in Table 2 below.

TABLE 2

| ShowContents | Show Me the Photo |
|---|---|
| | Show Me the Photos |
| | [Entity_Building] Can You Show Me the Photo |
| | ... |
| SavePhoto | Save the Photo Photo Save |
| | Save the Photo in [Entity_folder] |
| | ... |

In addition, the slot list may store at least one general noun that may be included in one slot, as illustrated in Table 3 below.

TABLE 3

| Building | Hotel A, Hotel B, Building C, Tower D, . . . |
|---|---|
| Car | XXX, YYY, ZZZ, . . . |

Meanwhile, the above-described resource information, operation list, and slot list may be stored in the server 200, and the electronic apparatus 100 may receive and store the resource information, the operation list, and the slot list from the server 200. In this case, when the application is installed, the electronic apparatus 100 may receive and store the resource information, the operation list, and the slot list from the server 200, and may receive and store the resource information, the operation list, and the slot list from the server 200 when the predetermined condition is satisfied. In addition, the electronic apparatus 100 may automatically generate the resource information by analyzing the application data. Specifically, when an application without the resource information of the template form is installed, the electronic apparatus 100 may generate a field value of a template by analyzing the application data. More specifically, the electronic apparatus 100 may acquire the operation information by extracting operation description information from the application data. In addition, the electronic apparatus 100 may acquire a representative utterance corresponding to the operation information based on the operation list received from the server 200. Alternatively, the electronic apparatus 100 may acquire a representative utterance corresponding to the operation information based on a natural language generation model stored in the electronic apparatus 100. In addition, the electronic apparatus 100 may acquire information on the predetermined condition based on resource information of a different template form. As described above, the electronic apparatus 100 may acquire the resource information of the template form based on the acquired representative utterance, operation information, and information on predetermined condition.

Specifically, the processor 130 may load the resource information, the usage information monitoring module, the natural language understanding model, the voice confliction confirmation module, and the domain classifier model stored in the memory 110 into the processor 130, and generate the natural language understanding model. The process of generating the natural language understanding model is described in detail with reference to FIG. 4B below.

Figure 4B:
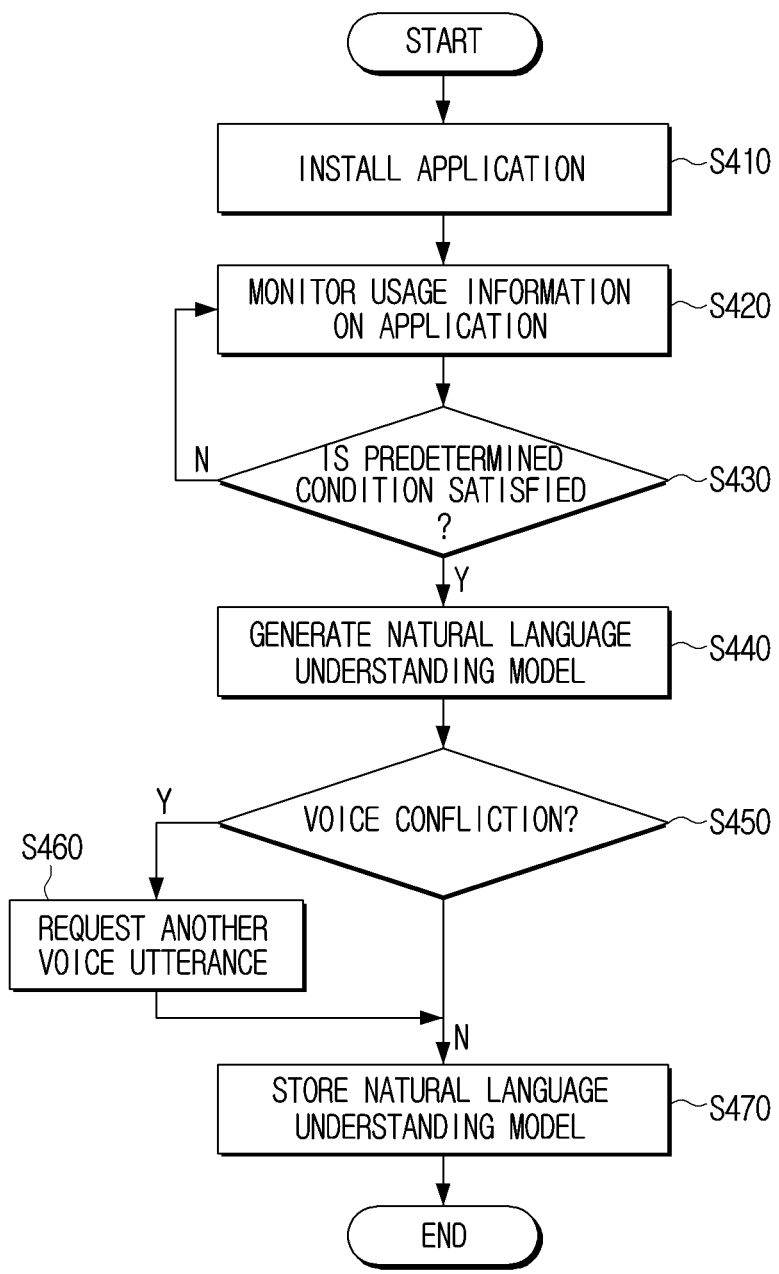
FIG. 4B is a diagram for describing a process in which a natural language understanding model is generated by an electronic apparatus according to another embodiment.

FIG. 4B is a diagram for describing a process in which a natural language understanding model is generated by an electronic apparatus 100 according to another embodiment.

The electronic apparatus 100 may install an application in the electronic apparatus 100 (operation S410). The application may be installed at the time of manufacturing the electronic apparatus 100, such as a built-in application, or may be installed by user's selection. The installation of the application in the electronic apparatus 100 may mean that information on the application is stored in the memory 110, and when an application execution command is input, the information on the application is loaded into the processor 130 so that various functions included in the application may be executed. Here, the information on the application may include resource information. As described above, the resource information may include at least one of information on a predetermined voice utterance, operation information corresponding to the predetermined voice utterance, predetermined condition information for generating a natural language understanding model, function information of an application corresponding to the predetermined voice utterance, and the like.

Meanwhile, the usage information monitoring module may monitor usage information on the installed application (operation S420).

In addition, the usage information monitoring module may identify whether the acquired usage information satisfies a predetermined condition included in the resource information (operation S430). For example, if the predetermined condition included in the resource information is a condition for executing the application three or more times, and the usage information satisfies such a condition (Y in operation S430), the processor 130 may generate a natural language understanding model corresponding to the corresponding application (operation S440). At this time, the natural language understanding model may be a public model generated based on the resource information of the application. However, the predetermined condition included in the resource information is not limited thereto, and may be that the identification number of a specific domain, specific intent information, or a specific operation through the artificial intelligence model of the virtual secretary service may be a predetermined number or more.

Specifically, the processor 130 may generate (or learn) the natural language understanding model based on mapping voice utterance information included in the resource information to corresponding operation information. For example, the processor 130 may generate or learn the natural language understanding model based on the voice utterance information of "Turn on A camera" included in the resource information and the operation of executing the A camera application. Accordingly, when the voice utterance "Turn on A camera" is recognized, it is identified by the domain classifier model that the domain included in the user's voice is "A camera application," and a natural language understanding model corresponding to "A camera application" may be generated to identify that the intent included in the user's voice is an operation of executing the A camera application.

As another example, the processor 130 may generate operation plan information by analyzing the operation information of the application, and acquire a representative utterance based on the generated operation plan information. In addition, the processor 130 may generate a natural language understanding model based on the operation information and the representative utterance.

Specifically, the processor 130 may generate an operation plan list by analyzing the operation of the application in advance. That is, the processor 130 may generate the operation plan list by recording the operation of the application when the user executes the application. In addition, the processor 130 may transmit the operation plan list to the server 200 to acquire a representative utterance of a natural language understanding model corresponding to the corresponding application. Alternatively, the processor 130 may analyze the meaning of the operation plan list through a translation module and translate the analyzed meaning into the representative utterance. Specifically, because the operation plan is a plurality of commands, the processor 130 may acquire a plurality of words through the operation plan. For example, if (1) [Activity: Execute] [Property: Baemin], (2) [Activity: Search] [Property: Chinese Food], and (3) [Activity: Display] [Property: search result] as an action plan are acquired, the processor 130 may acquire (1) in Baemin, (2) Search Chinese food, and (3) Display search result as a plurality of words. In addition, the processor 130 may generate the plurality of words as a single natural language sentence through the natural language generation module. At this time, the processor 130 may acquire the natural language sentence by assigning a weight value for each operation. Specifically, the processor 130 may assign a high weight value to an operation that includes a named entity, and assign a low weight value to a subsequent operation. For example, the processor 130 may obtain a natural language sentence such as "Search and show Chinese food in the Baemin" or "Search Chinese food in the Baemin" by inputting the plurality of words described above into the natural language generation module. At this time, the named entity included in the application name or operation may be acquired based on the slot list. In addition, the processor 130 may generate or learn a natural language understanding model based on the acquired operation plan and natural language sentence.

If the usage information does not satisfy the predetermined condition for generating the natural language understanding model (N in S430), the usage information monitoring module may continuously monitor usage information on the application or usage information on a specific domain or specific intent information through an artificial intelligence model of a virtual secretary service.

Meanwhile, the voice conflict confirmation module may confirm whether there is a conflict between information on the voice utterance included in the resource information and previously-registered user voice information (operation S450). Alternatively, the voice conflict confirmation module may confirm whether there is a confliction between text corresponding to the voice utterance and text corresponding to the previously-registered user voice.

Specifically, the voice conflict confirmation module may confirm whether there is a confliction based on the similarity between the voice utterance information (or text information corresponding thereto) included in the resource information and the previously-registered user voice (or text corresponding thereto). For example, it is assumed that there is a voice input of "Turn on A camera" in the previously-registered user's voice, and that an operation corresponding thereto includes an operation of executing the A camera application and capturing through a rear camera. In this case, because different operations correspond to the same voice input "Turn on A camera," the voice conflict confirmation module may identify that the voice conflict occurs.

As such, if the voice conflict is confirmed (Y in operation S450), the voice conflict confirmation module may request a voice utterance different from the voice utterance information included in the resource information (operation S460).

For example, the processor 130 may control a speaker to output a command, "Please provide a voice input different from Turn on A camera," or may control a display to display a UI window that includes, "Please provide a voice input different from 'Turn on A camera.'"

Accordingly, when another voice utterance is newly input to execute the A camera application, the voice conflict confirmation module may re-confirm whether the input voice utterance conflicts with the previously-registered user voice. If it is identified that there is no voice conflict, the voice conflict confirmation module may generate a natural language understanding module corresponding to the A camera application in a state in which information on the newly input user's voice is registered as a voice mapped to "operation of executing the A camera application." As an example, a user's voice input such as "Please execute A camera" different from "Turn on A camera" may be input and registered as a voice (or voice input) corresponding to the operation of executing the A camera application. Therefore, based on the generated natural language understanding model, when "Please execute A camera" is input, the operation of executing the A camera application is performed, and when "Turn on A camera" is input, an operation of capturing through the rear camera by executing the A camera application is executed, which may be distinguished from each other.

The case in which the voice utterance information included in the resource information is the same as the previously-registered user voice is described as an example, but even if the voice utterance information included in the resource information is similar to the previously-registered user voice and the natural language understanding model has a possibility to misinterpret the user's intent, the voice conflict confirmation module may request a voice utterance different from the voice utterance information included in the resource information.

Meanwhile, if it is identified that the information on the voice utterance included in the natural language understanding model does not conflict with the previously-registered user voice information (N in operation S450), the voice conflict confirmation module may register the information on the voice utterance as a voice corresponding to the operation of executing the A camera application.

The processor 130 may store the natural language understanding model in which the user's voice is registered in the memory 110 (operation S470). At this time, the stored natural language understanding model may be a personal model.

Thereafter, if the user's voice is input, the processor 130 may load the natural language understanding model stored in the memory 110 into the processor 130 to grasp (or determine) a user's intent included in the user's voice based on the natural language understanding model.

Meanwhile, according to the above-described embodiments, the natural language understanding model may be acquired by a method received from the server 200 or generated on the electronic apparatus 100 based on the usage information. In addition, the electronic apparatus 100 may remove (or delete) the acquired, generated, or stored natural language understanding model from the electronic apparatus 100 when a predetermined condition is satisfied (e.g., if a user input corresponding to the acquired natural language understanding model is not input a threshold number of times or more within a predetermined time period). If the user input is not input the threshold number of times or more indicates that the frequency of usage of the application corresponding to the natural language understanding model is low, the electronic apparatus 100 may remove the natural language understanding model having a low frequency of usage from the electronic apparatus 100.

Figure 5:
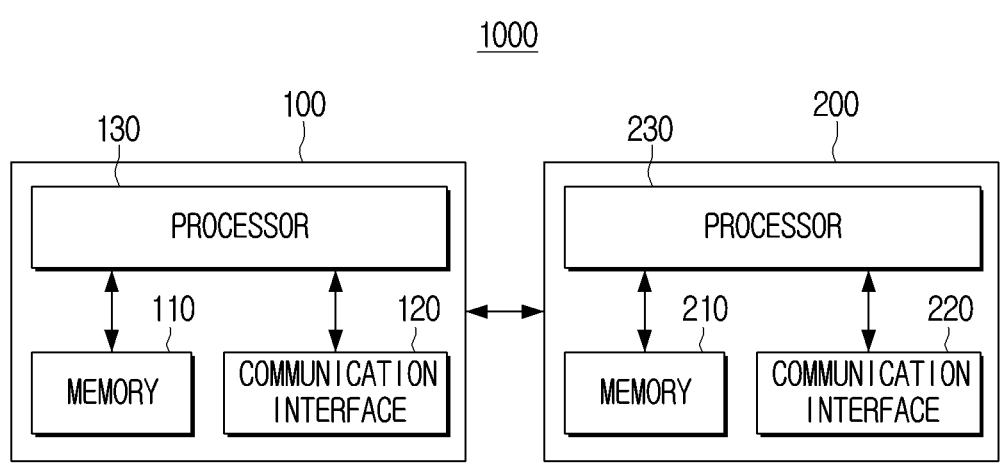
FIG. 5 is a block diagram illustrating an electronic apparatus and a server according to an embodiment.

FIG. 5 is a block diagram illustrating an electronic apparatus 100 and a server 200 according to an embodiment.

Referring to FIG. 5, the electronic apparatus 100 includes a memory 110 (e.g., at least one memory), a communication interface 120 (e.g., at least one communication interface), and a processor 130 (e.g., at least one processor), and the server 200 includes a memory 210 (e.g., at least one memory), a communication interface 220 (e.g., at least one communication interface), and a processor 230 (e.g., at least one processor).

The memory 110 may be electrically connected to the processor 130 and store data used in various embodiments.

The memory 110 may be implemented in the form of a memory embedded in the electronic apparatus 100 or may also be implemented in the form of a memory attachable to and detachable from the electronic apparatus 100, depending on a data storage purpose. For example, data for driving the electronic apparatus 100 may be stored in the memory embedded in the electronic apparatus 100, and data for extended functions of the electronic apparatus 100 may be stored in the memory attachable to and detachable from the electronic apparatus 100. Meanwhile, the memory embedded in the electronic apparatus 100 may be implemented as at least one of a volatile memory (e.g., a dynamic random access memory (DRAM), a static RAM (SRAM), a synchronous dynamic RAM (SDRAM), or the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, a NOR flash, or the like), a hard drive, or a solid state drive (SSD)). The memory attachable to and detachable from the electronic apparatus 100 may be implemented in a form such as a memory card (e.g., a compact flash (CF), a secure digital (SD), a micro secure digital (Micro-SD), a mini secure digital (Mini-SD), an extreme digital (xD), a multi-media card (MMC), or the like), an external memory (e.g., a USB memory) connectable to a USB port, or the like.

According to an embodiment, the memory 110 may store a usage information monitoring module, a voice confliction confirmation module, a natural language understanding model, and a domain classifier model.

The communication interface 120 includes circuitry and is a component capable of communicating with the server 200.

The communication interface 120 may include a Wi-Fi module, a Bluetooth module, an infrared (IR) module, a local area network (LAN) module, an Ethernet module, and the like. Here, each communication module may be implemented in the form of at least one hardware chip. The wireless communication module may include at least one communication chip that performs communication according to various wireless communication protocols such as Zigbee, a universal serial bus (USB), a mobile industry processor interface camera serial interface (MIPI CSI), 3rd generation (3G), 3rd generation partnership project (3GPP), Long Term Evolution (LTE), LTE Advanced (LTE-A), 4th generation (4G), 5th generation (5G), and the like, in addition to the above-mentioned communication methods. However, this is only an example and the communication interface 120 may use at least one communication module among various communication modules. In addition, the communication interface 120 may communicate with a server through wired communication.

In the configuration illustrated in FIG. 5, the memory 210 and the communication interface 220 included in the server 200 perform similar functions to the memory 110 and the communication interface 120 included in the electronic apparatus 100, and redundant descriptions thereof are omitted below.

Meanwhile, the processor 130 may transmit usage information on the application to the server 200 through the communication interface 120. The processor 230 of the server 200 may receive the usage information through the communication interface 220, and identify whether the application executed on the electronic apparatus 100 is an application stored in the memory 210 based on the received usage information. If it is identified that the application executed on the electronic apparatus 100 is the application stored in the memory 210, the processor 230 may identify a natural language understanding model corresponding to the corresponding application among a plurality of natural language understanding models on the memory 210. Thereafter, the processor 230 may control the communication interface 220 to transmit the identified natural language understanding model to the electronic apparatus 100. The processor 130 may store the natural language understanding model transmitted from the server 200 in the memory 110.

Figure 6:
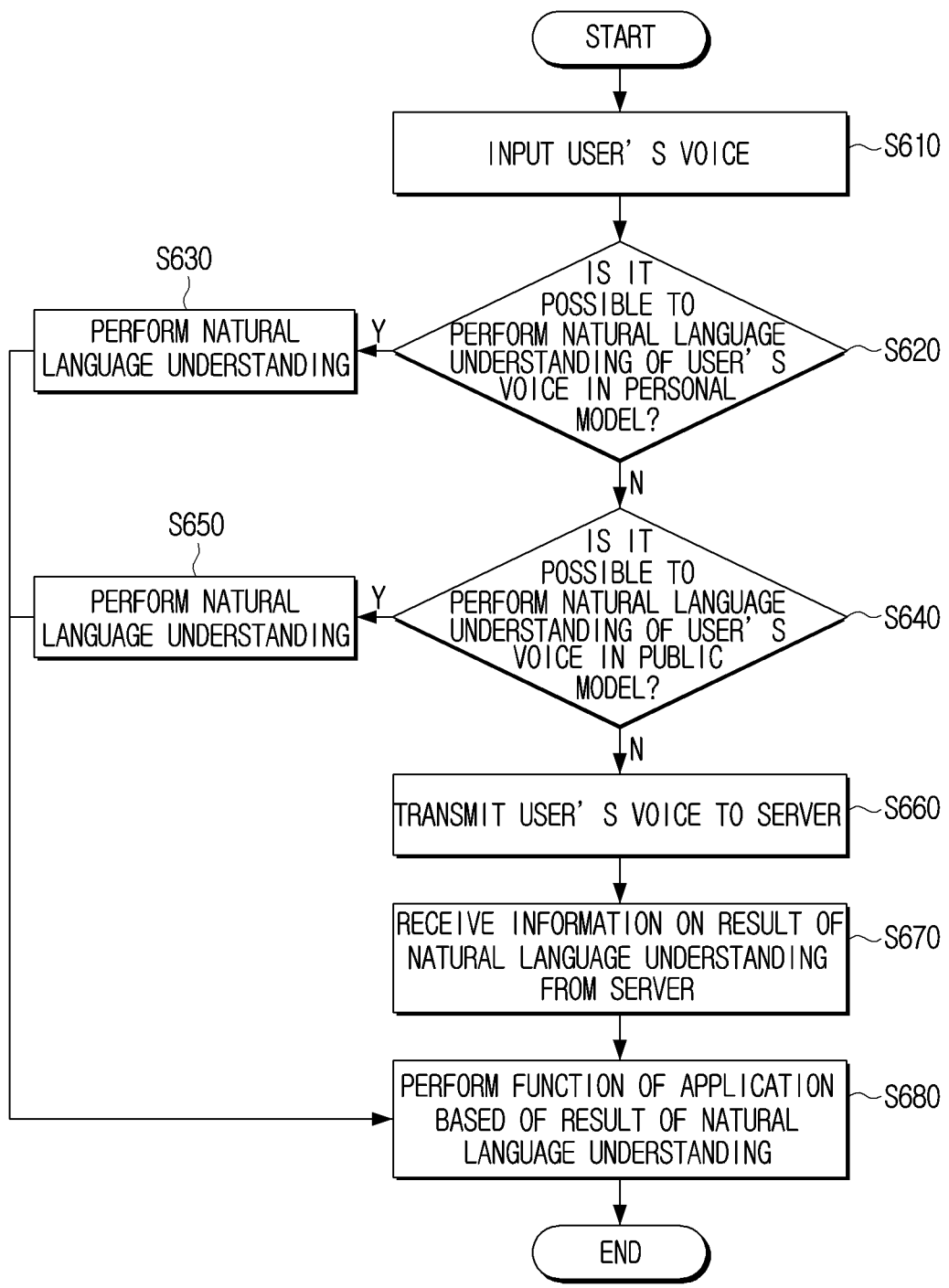
FIG. 6 is a view for describing a sequence in which a natural language understanding model operates according to an embodiment.

FIG. 6 is a view for describing a sequence in which a natural language understanding model operates according to an embodiment.

Referring to FIG. 6, the electronic apparatus 100 may receive a user's voice (e.g., user voice input) (operation S610). If the user's voice is input to the electronic apparatus 100, the electronic apparatus 100 may acquire text corresponding to the user's voice through a voice recognition model. It is understood, however, that one or more other embodiments are not limited thereto, and voice recognition for the user's voice may be performed by an external apparatus, an external server, and the like, and the electronic apparatus 100 may also receive text data corresponding to the user's voice from the outside. In addition, the domain classifier model included in the electronic apparatus 100 may identify a domain corresponding to the acquired text.

The electronic apparatus 100 may identify a natural language understanding model related to the identified domain. In this case, the electronic apparatus 100 may identify whether it is possible to perform natural language understanding of the user's voice through a personal model among natural language understanding models related to the identified domain (operation S620).

Here, the personal model is a model generated or learned based on the user's voice utterance of the electronic apparatus 100, and may be a model personalized to the user of the electronic apparatus 100. For example, the personal model may be a personalized model based on the natural language understanding model received from the server 200 or generated in the electronic apparatus 100 based on the usage information acquired through the usage information monitoring module. In other words, the personal model may be a natural language understanding model related to a specific application that is frequently used by a user compared to a public model described below.

If it is identified in the personal model that it is possible to perform natural language understanding of the user's voice (Y in operation S620), the electronic apparatus 100 may perform the natural language understanding through the corresponding personal model (operation S630), and may perform a function of the application based on a result of the natural language understanding (operation S680).

Meanwhile, if it is not possible to perform the natural language understanding of the user's voice in the personal model (N in operation S620), the electronic apparatus 100 may identify whether it is possible to perform the natural language understanding of the user's voice in a public model. Here, the public model is a model that is generated or learned based on a voice utterance of a public user (e.g., a different user, or a user that is a member of the public), and may be a model used to understand natural language included in a general voice of the public user. For example, the public model may be a natural language understanding model related to a built-in application that is basically installed in the electronic apparatus 100 when the electronic apparatus 100 is manufactured, or a natural language understanding model generated based on resource information of the application.

If it is identified in the public model that it is possible to perform natural language understanding of the user's voice (Y in operation S640), the electronic apparatus 100 may perform the natural language understanding through the corresponding public model (operation S650), and may perform a function of the application based on a result of the natural language understanding (operation S680).

Meanwhile, if it is not possible to perform the natural language understanding of the user's voice in the public model (N in operation S640), the electronic apparatus 100 may transmit the user's voice or text corresponding to the user's voice to the server 200 (operation S660). Because the natural language understanding model capable of performing the natural language understanding of the user's voice is not provided in the electronic apparatus 100, the electronic apparatus 100 may transmit the user's voice or text corresponding to the user's voice to the server 200 including a plurality of natural language understanding models in order to perform the natural language understanding of the user's voice.

Thereafter, the domain classifier model included in the server 200 may identify a domain corresponding to the received user's voice or text corresponding to the user's voice. The server 200 may identify a natural language understanding model related to the identified domain, and perform the natural language understanding of the user's voice (or text corresponding to the user's voice) through the identified natural language understanding model.

The electronic apparatus 100 may receive information on a result of the natural language understanding from the server 200 (operation S670). Thereafter, the electronic apparatus 100 may perform the function of the application based on the result of the natural language understanding (operation S680).

Figure 7:
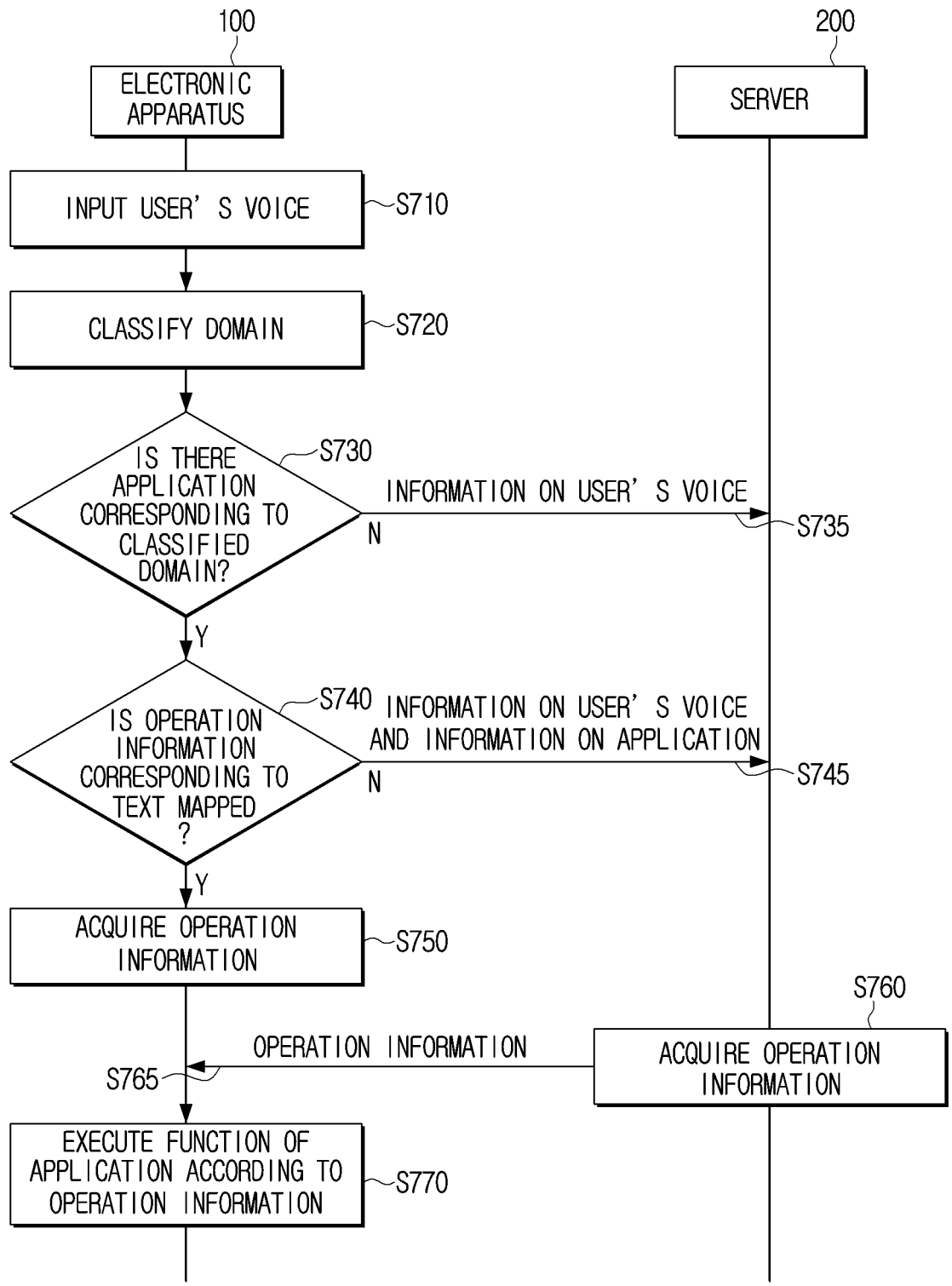
FIG. 7 is a sequence diagram for describing an example in which an electronic apparatus and a server work together to execute a function of an application according to a user's voice, according to an embodiment.

FIG. 7 is a sequence diagram for describing an example in which an electronic apparatus 100 and a server 200 work together to execute a function of an application according to a user's voice, according to an embodiment.

Referring to FIG. 7, the electronic apparatus 100 may receive a user's voice (e.g., user voice input) (operation S710). If the user's voice is input to the electronic apparatus 100, the electronic apparatus 100 may acquire text corresponding to the user's voice through a voice recognition model. It is understood, however, that one or more other embodiments are not limited thereto, and voice recognition for the user's voice may be performed by an external apparatus, an external server, and the like, and the electronic apparatus 100 may also receive text data corresponding to the user's voice from the outside.

The electronic apparatus 100 may classify a domain corresponding to the user's voice (operation S720). Specifically, the electronic apparatus 100 may identify a domain corresponding to the acquired text using the domain classifier model included in the electronic apparatus 100.

The electronic apparatus 100 may determine whether there is an application corresponding to the classified domain (operation S730). That is, the electronic apparatus 100 may determine whether there is a natural language understanding model corresponding to an application corresponding to the classified domain in the electronic apparatus 100. If there is no application corresponding to the classified domain (N in operation S730), the electronic apparatus 100 may transmit information on the user's voice to the server 200 (operation S735).

If it is determined that the there is an application corresponding to the classified domain (Y in operation S730), the electronic apparatus 100 may determine whether operation information corresponding to the text is mapped (operation S740). If the operation information corresponding to the text is not mapped in the electronic apparatus 100 (N in operation S745), the electronic apparatus 100 may transmit information on the user's voice and information on the application to the server 200 (operation S745).

If the operation information corresponding to the text is mapped in the electronic apparatus 100 (Y in operation S745), the electronic apparatus 100 may acquire operation information based on a natural language understanding model (operation S750). In addition, the electronic apparatus 100 may execute a function of the application according to the acquired operation information (operation S770).

Alternatively, the server 200 may acquire operation information using a natural language understanding model stored in the server 200 based on the information on the user's voice (e.g., text information) or the information on the application received from the electronic apparatus 100 (operation S760). In addition, the server 200 may transmit the acquired operation information to the electronic apparatus 100 (operation S765), and the electronic apparatus 100 may execute the function of the application according to the acquired operation information (operation S770).

It is understood that methods according to one or more embodiments of the disclosure described above may be implemented in the form of an application installable on an electronic apparatus.

In addition, methods according to one or more embodiments of the disclosure described above may be implemented by only upgrading software or hardware of a related art electronic apparatus.

In addition, one or more embodiments described above may also be performed through an embedded server included in the electronic apparatus, or at least one external server of the electronic apparatus.

Meanwhile, one or more embodiments described hereinabove may be implemented by software including instructions that are stored in a machine (e.g., a computer)-readable storage media. The machine is an apparatus that invokes the stored instructions from the storage media and is operable according to the invoked instructions, and may include the electronic apparatus according to disclosed embodiments. When the instructions are executed by the processor, the processor may perform functions corresponding to the instructions, either directly or using other components under the control of the processor. The instructions may include codes generated or executed by a compiler or an interpreter. The machine-readable storage medium may be provided in the form of a non-transitory storage medium. Here, the term "non-transitory" means that the storage medium does not include a signal and is tangible, but does not distinguish whether data is stored semi-permanently or temporarily in the storage medium. For example, the "non-transitory storage medium" may include a buffer in which data is temporarily stored.

In addition, a method according to one or more embodiments described above may be included and provided in a computer program product. The computer program product may be traded as a product between a seller and a purchaser. The computer program product may be distributed in the form of a machine-readable storage media (e.g., a compact disc read only memory (CD-ROM)), or online through an application store (e.g., PLAYSTORE™). In the case of the online distribution, at least a portion of the computer program product may be at least temporarily stored in a storage medium such as a memory of a server of a manufacturer, a server of an application store, or a relay server, or may be temporarily generated.

In addition, one or more embodiments described above may be implemented in a computer- or similar device-readable recording medium using software, hardware, or a combination thereof. In some cases, embodiments may be implemented by the processor itself. According to software implementation, procedures and functions described above may be implemented as separate software modules. Each of the software modules may perform one or more functions and operations described above.

Meanwhile, computer instructions for performing processing operations of a device according to one or more embodiments described above may be stored in a non-transitory computer-readable medium. The computer instructions stored in the non-transitory computer-readable medium allow a specific device to perform the processing operations of the device according to one or more embodiments described above when being executed by a processor of the specific device.

The non-transitory computer-readable medium is not a medium that stores data for a short time such as a register, a cache, a memory, or the like, but means a machine readable medium that semi-permanently stores data. A specific example of the non-transitory computer-readable medium may include a compact disk (CD), a digital versatile disk (DVD), a hard disk, a Blu-ray disk, a universal serial bus (USB), a memory card, a read only memory (ROM), or the like.

In addition, each of the components (e.g., modules or programs) according to embodiments described above may include a single entity or a plurality of entities, and some sub-components of the sub-components described above may be omitted, or other sub-components may be further included in various embodiments. Alternatively or additionally, some components (e.g., modules or programs) may be integrated into one entity to perform the same or similar functions performed by the respective components prior to the integration. The operations performed by the module, the program, or other component, in accordance with various embodiments may be executed in a sequential, parallel, iterative, or heuristic manner, or at least some operations may be executed in a different order or omitted, or other operations may be added.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed at least in the accompanying claims. These modifications should also be understood to fall within the scope and spirit of the disclosure.

Meanwhile, general terms that are currently widely used may be terms used in describing embodiments above in consideration of functions in the disclosure, but may be changed depending on the intention of those skilled in the art or a judicial precedent, an emergence of a new technique, and the like. In addition, in a specific case, terms arbitrarily chosen by an applicant may exist. In this case, the meaning of such terms may be mentioned in detail in a corresponding description portion of the disclosure. Therefore, the terms used in the disclosure should be defined on the basis of the meaning of the terms and the contents throughout the disclosure rather than simple names of the terms.

Singular expressions include plural expressions unless the context clearly indicates otherwise. It should be further understood that terms "include" or "constitute" used in the application specify the presence of features, numerals, steps, operations, components, parts, or combinations thereof mentioned in the specification, but do not preclude the presence or addition of one or more other features, numerals, steps, operations, components, parts, or combinations thereof.

Expressions such as "at least one of A and/or B" should be understood to represent either "A" or "B" or "A and B".

Expressions "first," "second," or the like, used in the disclosure may indicate various components regardless of a sequence and/or importance of the components, and are used only in order to distinguish one component from the other components, and do not otherwise limit the corresponding components.

When it is mentioned that any component (for example, a first component) is (operatively or communicatively) coupled with/to or is connected to another component (for example, a second component), it is to be understood that any component is directly coupled with/to another component or may be coupled with/to another component through the other component (for example, a third component).

In the disclosure, a "module" or a "~er/~or" may perform at least one function or operation, and may be implemented by hardware or software or be implemented by a combination of hardware and software. In addition, a plurality of "modules" or a plurality of "~ers/ors" may be integrated in at least one module and be implemented by at least one processor except for a "module" or a "~er/or" that needs to be implemented by specific hardware. In the specification, the term user may refer to a person using a terminal device (or terminal device) or an apparatus (e.g., an artificial intelligence electronic apparatus) using a terminal device.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed at least in the accompanying claims. These modifications should also be understood to fall within the scope and spirit of the disclosure.

What is claimed is:

1. An electronic apparatus comprising:
    a memory configured to store at least one instruction;
    a communication interface; and
    a processor configured to execute the at least one instruction to:
        obtain usage information on an application installed in the electronic apparatus, the usage information including at least one of a user input information related to the application and operation information of the application according to a user input,
        obtain a natural language understanding model, among a plurality of natural language understanding models, corresponding to the application based on the usage information,
        perform natural language understanding of a user voice input related to the application based on the natural language understanding model corresponding to the application, and
    perform an operation of the application based on the preformed natural language understanding,
    wherein the user input information related to the application comprises a number of executions of the application, and the operation information of the application comprises an execution time of the application, and
    wherein the processor is further configured to execute the at least one instruction to:
        control the communication interface to transmit the obtained usage information to an external server,
        receive the natural language understanding model corresponding to the application, among the plurality of natural language understanding models corresponding to a plurality of applications, from the external server via the communication interface, and
        store the natural language understanding model in the memory.

2. The electronic apparatus as claimed in claim 1, wherein the natural language understanding model corresponding to the application is received from the external server, based on the number of executions of the application included in the usage information being greater than or equal to a threshold number, or based on the execution time of the application being greater than or equal to a threshold time.

3. The electronic apparatus as claimed in claim 1, wherein:
    the application includes resource information that matches information on a predetermined voice utterance and operation information corresponding to the predetermined voice utterance; and
    the processor is further configured to execute the at least one instruction to, based on the usage information on the application satisfying a predetermined condition, generate the natural language understanding model corresponding to the application according to the information on the predetermined voice utterance and the operation information corresponding to the predetermined voice utterance.

4. The electronic apparatus as claimed in claim 1, wherein the processor is further configured to execute the at least one instruction to request a first user voice input corresponding to an operation of the application that is determined, based on the usage information, to be performed for greater than or equal to a threshold number of times or for greater than or equal to a threshold time.

5. The electronic apparatus as claimed in claim 4, wherein the processor is further configured to execute the at least one instruction to:
    determine whether the first user voice input conflicts with a user voice input stored in the memory, based on the first user voice input being input according to the request;
    request a second user voice input different from the first user voice input, based on determining that the first user voice input conflicts with the stored user voice input; and
    store, in the memory, the first user voice input in correspondence with the operation of the application, based on determining that the first user voice input does not conflict with the stored user voice input.

6. The electronic apparatus as claimed in claim 1, wherein the processor is further configured to execute the at least one instruction to request, from an external server, the natural language understanding model corresponding to the application, based on the application being installed in the electronic apparatus.

7. The electronic apparatus as claimed in claim 1, wherein:
    the natural language understanding model includes at least one of a personal model generated based on a voice utterance of a user using the electronic apparatus and a public model generated based on a voice utterance of a public user; and
    the processor is further configured to execute the at least one instruction to:
        perform the natural language understanding of the user voice input in the personal model,
        perform the natural language understanding of the user voice input in the public model, based on the natural language understanding of the user voice input being unsuccessful in the personal model, and
        transmit the user voice input to an external server to perform the natural language understanding of the user voice input, based on the natural language understanding of the user voice input being unsuccessful in the public model.

8. The electronic apparatus as claimed in claim 1, wherein the processor is further configured to execute the at least one instruction to remove the obtained natural language understanding model, based on the user voice input not being input for greater than or equal to a threshold number of times or for greater than or equal to a threshold period of time.

9. A control method of an electronic apparatus, the control method comprising:
    obtaining usage information on an application installed in the electronic apparatus, the usage information including at least one of a user input information related to the application and operation information of the application according to a user input;

obtaining, based on the usage information, a natural language understanding model, among a plurality of natural language understanding models, corresponding to the application;

performing natural language understanding of a user voice input related to the application based on the natural language understanding model corresponding to the application; and performing an operation of the application based on the performed natural language understanding, wherein the user input information related to the application comprises a number of executions of the application and the operation information of the application comprises an execution time of the application, and wherein the obtaining the natural language understanding model comprises:

transmitting the obtained usage information to an external server, receiving the natural language understanding model corresponding to the application, among the plurality of natural language understanding models corresponding to a plurality of applications, from the external server, and storing the natural language understanding model in the electronic device.

10. The control method as claimed in claim 9, wherein the natural language understanding model corresponding to the application is received from the external server, based on the number of executions of the application included in the usage information being greater than or equal to a threshold number, or based on the execution time of the application being greater than or equal to a threshold time.

11. The control method as claimed in claim 9, wherein:

the application includes resource information that matches information on a predetermined voice utterance and operation information corresponding to the predetermined voice utterance; and the obtaining the natural language understanding model comprises, based on the usage information on the application satisfying a predetermined condition, generating the natural language understanding model corresponding to the application according to the information on the predetermined voice utterance and the operation information corresponding to the predetermined voice utterance.

12. The control method as claimed in claim 9, further comprising requesting a first user voice input corresponding to an operation of the application that is determined, based on the usage information, to be performed for greater than or equal to a threshold number of times or for greater than or equal to a threshold time.

13. The control method as claimed in claim 9, further comprising:

determining whether that the first user voice input conflicts with a input user voice stored in the electronic device, based on the first user voice input being input according to the request;

requesting a second user voice input different from the first user voice input, based on determining that the first user voice input conflicts with the stored user voice input; and storing, in the electronic device, the first user voice input in correspondence with the operation of the application, based on determining that the first user voice input does not conflict with the stored user voice input.

14. The control method as claimed in claim 9, further comprising requesting, from an external server, the natural language understanding model corresponding to the application, based on the application being installed in the electronic apparatus.

15. The control method as claimed in claim 9, wherein:

the natural language understanding model includes at least one of a personal model generated based on a voice utterance of a user using the electronic apparatus and a public model generated based on a voice utterance of a public user; and the performing the natural language understanding of the user voice input comprises:

performing the natural language understanding of the user voice input in the personal model, performing the natural language understanding of the user voice input in the public model, based on the natural language understanding of the user voice input being unsuccessful in the personal model, and transmitting the user voice input to an external server to perform the natural language understanding of the user voice input, based on the natural language understanding of the user voice input being unsuccessful in the public model.

16. The control method as claimed in claim 9, further comprising removing the obtained natural language understanding model, based on the user voice input not being input for greater than or equal to a threshold number of times or for greater than or equal to a threshold period of time.

17. A non-transitory computer-readable recording medium having recorded thereon instructions executable by at least one processor to perform a control method of an electronic apparatus, the control method comprising:

obtaining usage information on an application installed in the electronic apparatus, the usage information including at least one of a user input information related to the application and operation information of the application according to a user input;

obtaining, based on the usage information, a natural language understanding model, among a plurality of natural language understanding models, corresponding to the application;

performing natural language understanding of a user voice input related to the application based on the natural language understanding model corresponding to the application; and performing an operation of the application based on the performed natural language understanding, wherein the user input information related to the application comprises a number of executions of the application and the operation information of the application comprises an execution time of the application; and wherein the obtaining the natural language understanding model comprises:

transmitting the obtained usage information to an external server, receiving the natural language understanding model corresponding to the application, among the plurality of natural language understanding models corresponding to a plurality of applications, from the external server, and storing the natural language understanding model in the electronic device.

* * * * *